US011614793B2

(12) United States Patent
O'Keefe et al.

(10) Patent No.: US 11,614,793 B2
(45) Date of Patent: Mar. 28, 2023

(54) PRECISION TRACKING OF USER INTERACTION WITH A VIRTUAL INPUT DEVICE

(71) Applicant: Logitech Europe S.A., Lausanne (CH)

(72) Inventors: Denis O'Keefe, County Cork (IE); Aidan Kehoe, County Cork (IE); Damien O'Sullivan, County Cork (IE); Fabien Zellweger, County Cork (IE)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/288,623

(22) Filed: Feb. 28, 2019

(65) Prior Publication Data
US 2019/0265781 A1  Aug. 29, 2019

Related U.S. Application Data

(60) Provisional application No. 62/636,547, filed on Feb. 28, 2018.

(51) Int. Cl.
*G06F 3/0346* (2013.01)
*G06F 3/01* (2006.01)
*G06F 3/16* (2006.01)

(52) U.S. Cl.
CPC ............ *G06F 3/011* (2013.01); *G06F 3/016* (2013.01); *G06F 3/0346* (2013.01); *G06F 3/167* (2013.01)

(58) Field of Classification Search
CPC .............. G06F 1/163; G06F 1/1686; G06F 2203/0331; G06F 3/011; G06F 3/014; G06F 3/016; G06F 3/0304; G06F 3/0346; G06F 3/0426; G06F 3/167
See application file for complete search history.

(56) References Cited

U.S. PATENT DOCUMENTS

| | | | | |
|---|---|---|---|---|
| 7,662,113 B2* | 2/2010 | Pearl | ...................... | A61B 5/444 600/587 |
| 8,502,769 B2* | 8/2013 | Kim | ....................... | G06F 3/033 345/156 |
| 8,743,052 B1* | 6/2014 | Keller | ..................... | G06F 3/017 345/156 |
| 9,891,718 B2* | 2/2018 | Connor | .................. | A61B 5/389 |
| 10,237,509 B1* | 3/2019 | Kim | ..................... | G06F 3/0233 |
| 10,261,595 B1* | 4/2019 | Kin | ....................... | G06F 3/0346 |

(Continued)

*Primary Examiner* — Temesghen Ghebretinsae
*Assistant Examiner* — Sosina Abebe
(74) *Attorney, Agent, or Firm* — Kilpatrick Townsend & Stockton LLP

(57) ABSTRACT

An augmented reality or virtual reality (AR/VR) system can include a virtual input device that can be rendered by an HMD, and a wearable impact detection device, such as a ring, smart watch, wristband, etc. with an inertial measurement unit (IMU), that can be used in conjunction with the HMD to track a location of the user's hands relative to the perceived location of the rendered virtual keyboard using, e.g., vision-based tracking via the HMD and determine when an intended input (e.g., button press) is entered by the user by detecting an impact of the user's finger(s) on a physical surface. The AR/VR system can then determine which key is pressed based on the physical location of the user's hands (e.g., using the vision-based tracking) and, more precisely, the user's finger(s) causing the detected impact and the closest key of the virtual input device to the detected point of impact.

12 Claims, 10 Drawing Sheets

(56) References Cited

U.S. PATENT DOCUMENTS

| | | | |
|---|---|---|---|
| 10,409,412 B1* | 9/2019 | Andre | G06F 3/044 |
| 10,860,100 B2* | 12/2020 | Osterhout | G06F 3/013 |
| 2003/0142065 A1* | 7/2003 | Pahlavan | G06F 3/0346 |
| | | | 345/156 |
| 2009/0096746 A1* | 4/2009 | Kruse | G06F 3/016 |
| | | | 340/407.1 |
| 2009/0278798 A1* | 11/2009 | Kim | G06F 3/014 |
| | | | 345/158 |
| 2011/0007035 A1* | 1/2011 | Shai | G06F 3/0338 |
| | | | 345/179 |
| 2012/0249310 A1* | 10/2012 | Hotaling | G01S 5/08 |
| | | | 340/13.24 |
| 2014/0368455 A1* | 12/2014 | Croisonnier | G06F 3/0488 |
| | | | 345/173 |
| 2015/0063661 A1* | 3/2015 | Lee | G06F 3/011 |
| | | | 382/124 |
| 2015/0277559 A1* | 10/2015 | Vescovi | G06F 3/017 |
| | | | 345/173 |
| 2015/0293644 A1* | 10/2015 | Watanabe | G06F 1/163 |
| | | | 345/168 |
| 2015/0338916 A1* | 11/2015 | Priyantha | G06F 1/163 |
| | | | 345/173 |
| 2016/0077587 A1* | 3/2016 | Kienzle | G06F 3/0346 |
| | | | 345/156 |
| 2016/0116941 A1* | 4/2016 | Kuwabara | G06F 1/163 |
| | | | 361/679.03 |
| 2017/0003762 A1* | 1/2017 | Ishii | G06F 3/0383 |
| 2017/0308165 A1* | 10/2017 | Erivantcev | G06F 3/038 |
| 2017/0351345 A1* | 12/2017 | Nirjon | G06F 3/014 |
| 2018/0001198 A1* | 1/2018 | Frappiea | A63F 13/2145 |
| 2018/0239429 A1* | 8/2018 | Gupta | G06F 3/0346 |
| 2018/0275869 A1* | 9/2018 | Zhao | G06F 3/0414 |
| 2018/0350150 A1* | 12/2018 | Powderly | G02B 27/017 |
| 2019/0187751 A1* | 6/2019 | Griffin | G06F 3/03547 |

* cited by examiner

PRECISION TRACKING OF USER INTERACTION WITH A VIRTUAL INPUT DEVICE

CROSS-REFERENCE PARAGRAPH FOR RELATED APPLICATION

This application is a non-provisional application and claims the benefit and priority of U.S. Provisional Application No. 62/636,547, filed on Feb. 28, 2018, and titled "PRECISION TRACKING OF USER INTERACTION WITH A VIRTUAL INPUT DEVICE," which is hereby incorporated by reference in its entirety for all purposes.

TECHNICAL FIELD

The present disclosure relates generally to virtual and augmented reality systems and in particular to tracking a user interaction with a virtual input device in a virtual or augmented reality environment.

BACKGROUND

Virtual, mixed, or augmented reality can be associated with a variety of applications that comprise immersive, highly visual, computer-simulated environments. These environments can simulate a physical presence of a user in a real or imagined world. The computer simulation of these environments can include computer rendered images, which can be presented by means of a graphical display. The display can be presented as a head mounted display (HMD) that may encompass all or part of a user's field of view.

A user can interface with the computer-simulated and computer-augmented environment by means of a physical user interface device or peripheral device. In some contemporary systems, a virtual keyboard can be used to provide a user with a virtual work environment without the need to carry around cumbersome computer peripherals. While these technologies are promising, they are fraught with technical challenges that have resulted in lackluster performance characteristics and limited functionality. Higher performance virtual peripherals that can operate within a virtual or augmented environment are needed.

BRIEF SUMMARY

In some embodiments, an augmented reality or virtual reality (AR/VR) system can include a virtual input device that can be rendered by an HMD, and a wearable impact detection device, such as a ring, smart watch, wristband, etc. with an inertial measurement unit (IMU), that can be used in conjunction with the HMD to track a location of the user's hands relative to the perceived location of the rendered virtual keyboard using, e.g., vision-based tracking via the HMD and determine when an intended input (e.g., button press) is entered by the user by detecting an impact of the user's finger(s) on a physical surface. The AR/VR system can then determine which key is pressed based on the physical location of the user's hands (e.g., using the vision-based tracking) and, more precisely, the user's finger(s) causing the detected impact and the closest key of the virtual input device to the detected point of impact.

In some embodiments, a method of tracking a user interaction with a virtual input device may include tracking a displayed location of a virtual input device (e.g., in a virtual reality or augmented reality (VR/AR) environment displayed by an HMD, a projection on a surface of an object by a projector, etc.), the virtual input device rendered by a display device (e.g., HMD, projector, etc.); tracking a movement of a user's hand (e.g., within the VR/AR environment, on the surface of the object (e.g., table, desk, tablet, mat, etc.), etc.); receiving, from an impact detection device, impact data corresponding to a detected impact of the at least one finger of the user's hand on a physical surface; determining a location of the detected impact relative to the rendered virtual input device, the virtual input device including one or more virtual keys; determining a first virtual key of the one or more virtual keys that has a location corresponding to the location of the detected impact; and in response to determining that the first virtual key has a location corresponding to the location of the detected impact, generating a command indicating a key press of the first virtual key. The impact detection device can be one of a ring or a wristband worn by the user, where the detected impact may be detected via an inertial measurement unit (IMU) coupled to the impact detection device that is configured to track a motion of the input device in three-dimensional (3D) space. In some cases, the impact detection device can be a standalone device configured to be placed on the physical surface to detect impacts, wherein the detected impact is detected via IMU or a plurality of directional microphones configured to detect the location of the user's finger relative to the rendered virtual input device and the corresponding impact force, which may have a form factor similar to that of a puck or key fob attachment, as further described below.

In further embodiments, the tracking of the movement of the user's hand within the VR/AR environment can be performed by a vision-based tracking system coupled to the display device. The determining of the first virtual button having a location corresponding to the location of the detected impact may be based upon the vision-based tracking system and one or more of: a key press frequency analysis for the one or more virtual keys; or a probability of a next virtual key to be pressed based on a language model. In some implementations, the method may further include generating at least one of an auditory feedback, visual feedback, or haptic feedback indicating that a keypress of the first virtual key is detected. The method may also include determining whether the detected impact has a detected impact force greater than a force threshold value; and generating the command indicating a key press of the first virtual key is further based upon whether the detected impact force is greater than the force threshold value. In some embodiments, the virtual input device may be a virtual keyboard, and the display device may be a head-mounted display (HMD).

In certain embodiments, a system may include one or more processors and an HMD controlled by the one or more processors and configured to render a virtual input device on a physical surface from the point-of-view of a user wearing the HMD; a vision-based tracking system communicatively coupled to the display device and the one or more processors, and configured to track a location of a user's hand relative to the rendered virtual input device; and a wearable device communicatively coupled to the one or more processors, configured to be worn by the user, and operable to detect an impact of one or more fingers of the user's hand on the physical surface, where the one or more processors are configured to generate a command indicating a detected button press of a first button on the virtual input device in response to: the wearable device providing impact data corresponding to a detected impact of a first finger of the one or more fingers of the user's hand on the physical surface;

and determining that a detected location of the first finger corresponds to a detected location of the first button on the virtual input device. The wearable device can be one of a ring or a wristband worn by the user, where the detected impact can be detected via an IMU coupled to the impact detection device that is configured to track a motion of the input device in 3D space. The virtual input device may be a virtual keyboard, touch pad, game controller, remote control, or other suitable virtual input device, as further described below. The display device may be an HMD or other suitable display device, as would be appreciated by one of ordinary skill in the art with the benefit of this disclosure.

In some embodiments, a system includes one or more processors and one or more non-transitory, computer-readable storage mediums containing instructions configured to cause the one or more processors to perform operations including: tracking a displayed location of a virtual input device in a virtual reality or augmented reality (VR/AR) environment, the virtual input device (e.g., virtual keyboard) rendered by a display device (e.g., HMD); tracking a movement of a user's hand within the VR/AR environment; receiving, from an impact detection device, impact data corresponding to a detected impact of the at least one finger of the user's hand on a physical surface; determining a location of the detected impact relative to the rendered virtual input device, the virtual input device including one or more virtual keys; determining a first virtual key of the one or more virtual keys that has a location corresponding to the location of the detected impact; and in response to determining that the first virtual key has a location corresponding to the location of the detected impact, generating a command indicating a key press of the first virtual key.

In some cases, the impact detection device can be one of a ring or a wristband worn by the user, wherein the detected impact is detected via an IMU coupled to the impact detection device that is configured to track a motion of the input device in 3D space. In some cases, the tracking of the movement of the user's hand within the VR/AR environment may be performed by a vision-based tracking system coupled to the display device. In certain embodiments, the instructions can be further configured to cause the one or more processors to perform operations including: generating at least one of an auditory feedback, visual feedback, or haptic feedback indicating that a keypress of the first virtual key is detected and/or cause the one or more processors to perform operations including: determining whether the detected impact has a detected impact force greater than a force threshold value; and generating the command indicating a key press of the first virtual key is further based upon whether the detected impact force is greater than the force threshold value.

BRIEF DESCRIPTION OF THE DRAWINGS

Aspects, features and advantages of embodiments of the present disclosure will become apparent from the following description of embodiments in reference to the appended drawings in which like numerals denote like elements.

DETAILED DESCRIPTION

Figure 1:
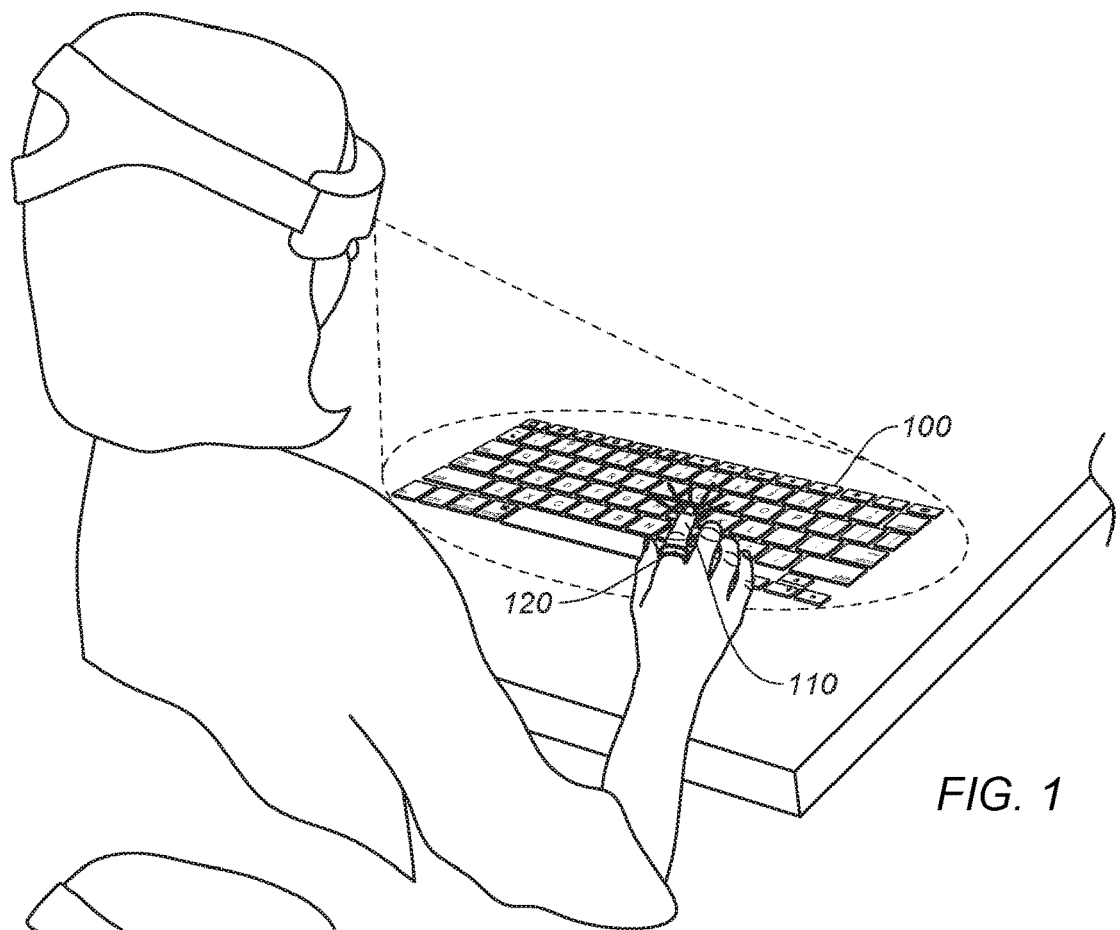
FIG. 1 shows a simplified diagram of a system that uses a ring for detecting an impact of a user's finger against a physical surface and at a location of a particular key of a virtual input device, according to certain embodiments.

Aspects of the present disclosure relate generally to virtual and augmented reality systems, and in particular to virtual input devices with improved tracking characteristics, according to certain embodiments.

In the following description, various embodiments of a system for accurate tracking a user interaction with a virtual input device will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

In certain embodiments, an augmented reality or virtual reality (AR/VR) system includes a virtual input device (e.g., a rendered keyboard) that can be rendered by an HMD, and a wearable impact detection device, such as a ring, smart watch, wristband (e.g., see FIGS. 1-2), or the like, with an inertial measurement unit (IMU) that can be used in conjunction with the HMD to allow the system to track a location of the user's hands relative to the perceived location of the rendered virtual keyboard using a suitable tracking system (e.g., vision-based tracking via the HMD and then determine when an intended input (e.g., button press) is entered by the user by detecting an impact of the user's finger(s) on a physical surface. The AR/VR system can then determine which key is pressed based on the physical location of the user's hands (e.g., using the vision-based tracking) and, more precisely, the user's finger(s) causing the detected impact, and the closest key of the virtual keyboard to the detected point of impact. The various non-limiting embodiments that follow depict systems that incorporate VR and/or AR systems, however some implementations may render the virtual input device(s) in the real world without virtual or augmented reality interfaces. For example, a virtual input device (e.g., a keyboard) may be rendered (e.g., projected) on a surface (e.g., desktop) and embodiments of the invention may detect a user's hand/fingers and corresponding movements and impacts relative to the rendered keyboard without incorporating aspects of VR or AR environments, as would be appreciated by one of ordinary skill in the art with the benefit of this disclosure.

Other systems can be used in conjunction with or in lieu of the systems described above to determine how the point of impact corresponds to a particular key on the virtual keyboard. For instance, a puck (e.g., see FIG. 3) that operates as an impact detection device can further detect a location of the user's finger(s) or hand using a microphone array or other location detection schemes. In some cases, logic can be used to detect a next likely button press based on a key press frequency, a probability-based selection based on a language model, or the like. Once the impact is detected and a corresponding key press is determined, the system can generate a command (e.g., a human interface device or "HID" command) to control aspects of a rendered display (e.g., control a cursor). These concepts and others are described in more depth in the embodiments and descriptions throughout this document.

Example Embodiments of AR/VR Systems and Impact Detection Schemas

At a high level of abstraction, aspects of the invention involve a user wearing an AR/VR HMD configured to render a virtual input device that appears to a user to be projected on a surface. A user's finger(s) is tracked over the virtual input device to determine which key of the virtual input device that the user's finger is over, and an impact (e.g., a tap) is detected on a physical surface to indicate when the user intends to initiate a key press on the key.

Impact detection can be performed using any of a number of different impact detection devices including a single ring (e.g., single finger detection) or multiple rings (e.g., multiple finger detection) that include impact detection technologies such as an IMU, force sensor(s), strain gauge(s), proximity sensor, or the like. An example of a ring-based impact detection schema is shown in FIG. 1. FIG. 1 shows a simplified diagram of a system that uses ring 120 for detecting an impact of a user's finger (of hand 110) against a physical surface and at a location of a particular key of a virtual input device 100, according to certain embodiments. In some embodiments, ring 120 may be used to detect the impact of adjacent figures. For instance, ring 120 may be configured on a user's ring finger and may detect an impact of the user's middle finger and/or pinky finger on the same hand. In some cases, the impact of a user's index finger or thumb may be detected by ring 120 configured on the user's ring finger. In some implementations, impacts for different fingers may have different impact thresholds and/or different impact characteristics. For example, a middle finger impact may be detected when a certain impact threshold is met and an impact characteristic that corresponds to a middle finger impact is detected via IMU, force sensor, proximity sensor, audio sensor(s), or the like.

Figure 2:
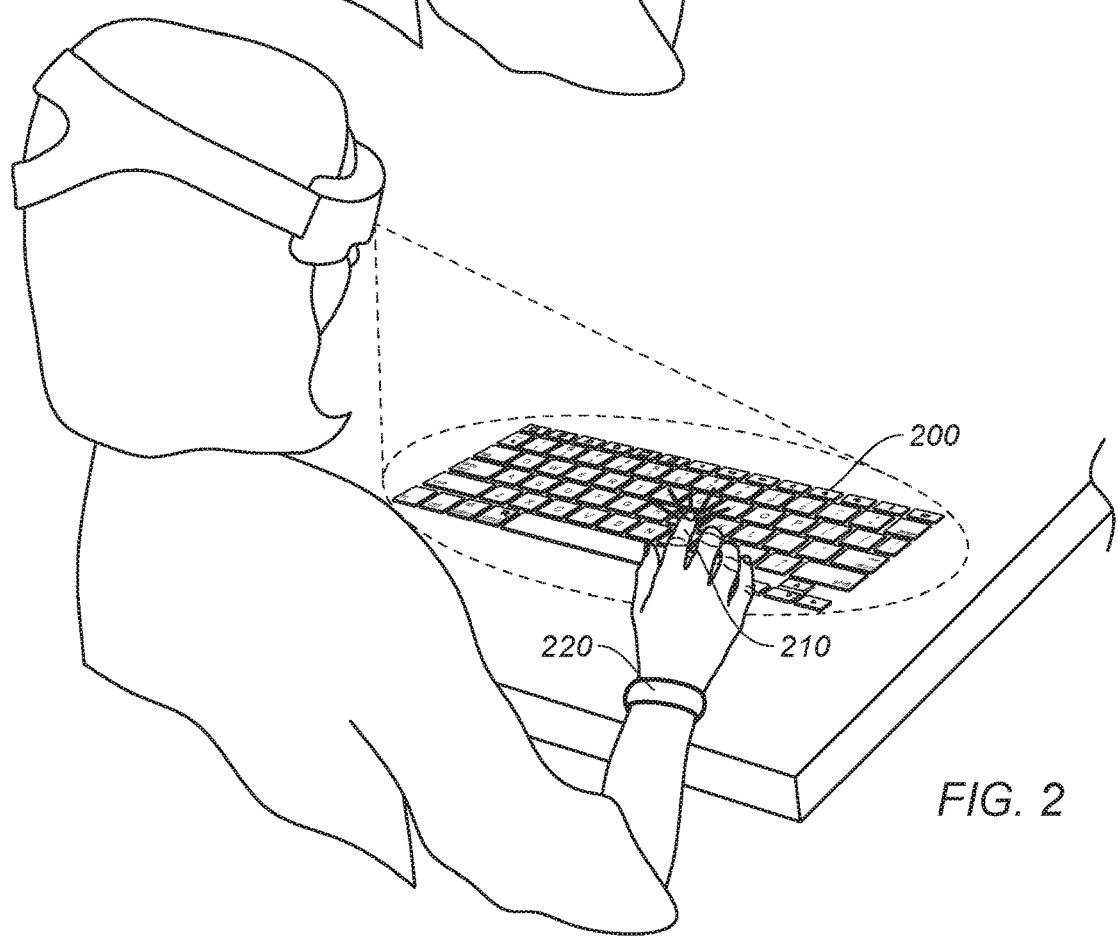
FIG. 2 shows a simplified diagram of a system that uses a wearable device for detecting an impact of a user's finger against a physical surface and at a location of a particular key of a virtual input device, according to certain embodiments.

Alternatively or additionally, a wristband or smartwatch device can be used to detect multiple taps or touches on a surface to detect multi-touch, gestures (e.g., swipes, touch-and-hold, touch-and-swipe, etc.), and the like. For example, FIG. 2 shows a simplified diagram of a system that uses a wearable device (e.g., wristband 220) for detecting an impact of a user's finger (of hand 210) against a physical surface and at a location of a particular key of a virtual input device 200, according to certain embodiments. In some embodiments, the wristband or smartwatch device may be configured to detect muscle and/or nerve movements in the wrist, which may provide data corresponding to finger movements and impacts, and may be used alone or in conjunction with IMU data (or other impact detection data, as described above) to determine finger impacts and their corresponding locations.

Figure 3:
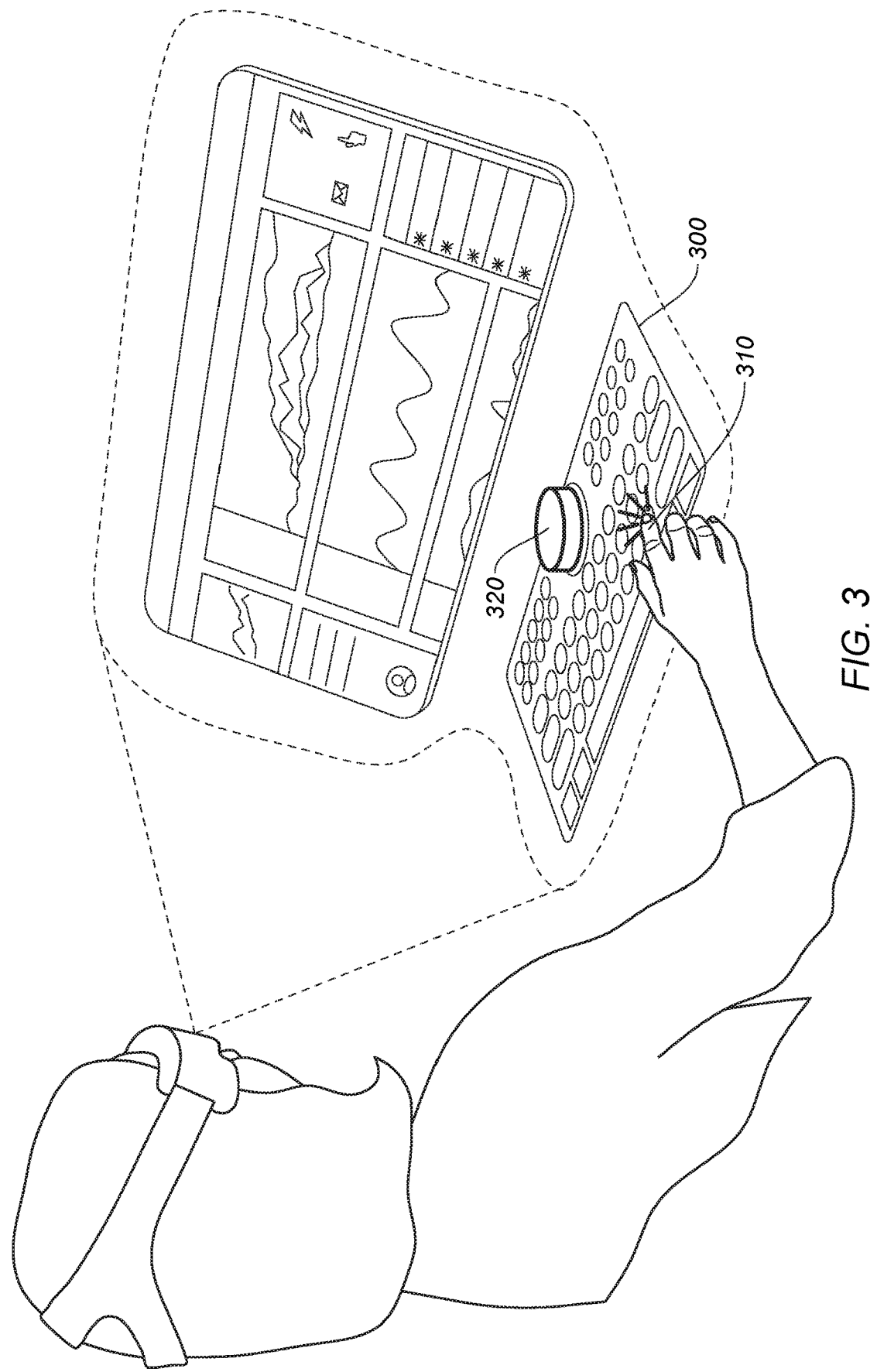
FIG. 3 shows a simplified diagram of a system that uses a stationary standalone device for detecting an impact of a user's finger against a physical surface and at a location of a particular key of a virtual input device, according to certain embodiments.

In some embodiments, the impact detection device can be a standalone device that can be placed on a physical surface and configured to detect impacts. The detected impact can be detected via IMU and/or a plurality of directional microphones (e.g., proximity sensing) configured to detect the location of the user's finger relative to the rendered virtual input device and the corresponding impact force. Some embodiments may employ one or more image sensors (e.g., camera(s)) on the standalone device that may be configured to detect finger movements, finger pressing motions and other gestures, etc. In some implementations, a projected light field (e.g., IR light emitter(s) with IR camera(s) detection) can be used to detect an impact, or more specifically a pressing motion. For example, FIG. 3 shows a simplified diagram of a system that uses a stationary standalone device (e.g., puck 310) for detecting an impact of a user's finger against a physical surface and at a location of a particular key of a virtual input device 300, according to certain embodiments. In some embodiments, the puck may be conveniently integrated as a removable part of a small mobile key fob or other device. Other implementations may utilize other input devices as impact detection devices, such as an AR/VR controller (e.g., with an IMU) sitting on the impacted surface. It should be understood that while the various embodiments depicted herein show the impact surface as a desk, any form of physical surface can be used to create an impact, such as a table, chair, door, window, book, hand held object, part of the body (e.g., leg, hand, arm, torso), laptop surface, etc.

In certain embodiments, a surface-based impact detection device (e.g., puck, key fob) can be used as a physical anchor for the virtual input device (e.g., keyboard). That is, the HMD may display the virtual input device on a surface at a location relative to the impact detection device. An example of what this may look like is shown in FIG. 3, as the rendered keyboard and display are clustered around the puck. In some cases, a gesture, action, and/or button on the puck or fob could be used to instantiate the virtual input device.

As described above, a virtual touch screen could also be anchored to this puck/fob, which can be readily moved by moving the puck. Having the virtual input device spatially anchored to the puck, the system can determine the relative distances between each key and the impact detection puck, and use a matrix of sensitivity adjustments (e.g., X,Y distance from the sensor(s)) to adjust the response so that the user feels the same response pressing a key far from the sensor as pressing a key close by the sensor so that the system does not accidentally trigger. In some cases, this relative key impact detection sensitivity could be generated by a fixed matrix (e.g., based on the relative puck/key positions), or it could be dynamically generated by the finger(s) tracking from the HMD (e.g., detecting a finger close to the puck (e.g., <10 cm) may cause the system to be set to a low sensitivity threshold, and detecting a finger far from the puck (e.g., >10 cm) may cause the system to be set to a relatively higher sensitivity threshold).

Figure 4:
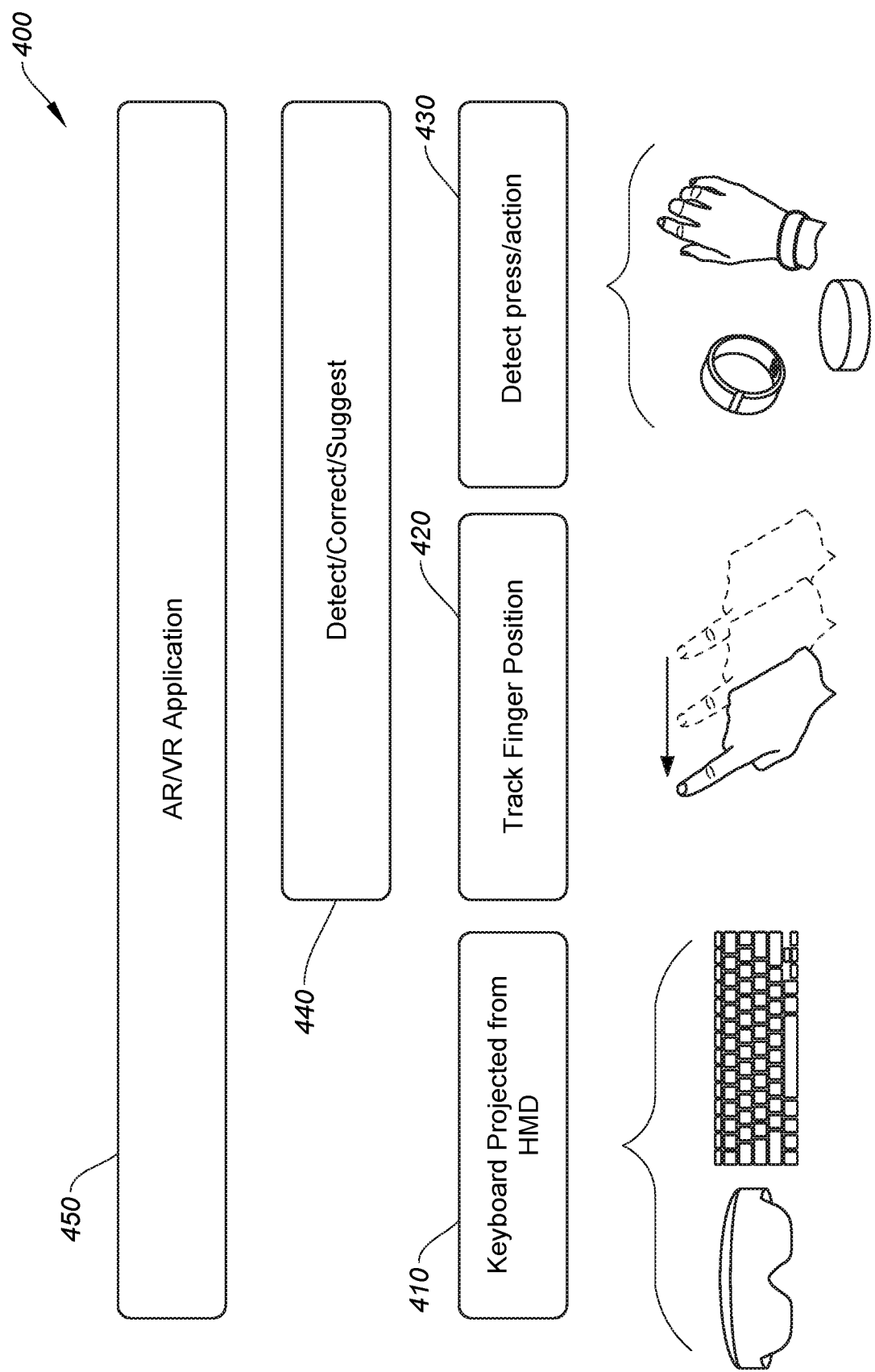
FIG. 4 shows a simplified block diagram of a system for detecting key presses on a virtual input device, according to certain embodiments.

FIG. 4 shows a simplified block diagram of a system 400 for detecting key presses on a virtual input device, according to certain embodiments. System 400 can include a number of components including hardware for rendering a virtual input device. A typical example can be a virtual keyboard projected to a user's eyes via HMD (block 410). System 400 may incorporate hand and/or finger position tracking (block 420). Finger position tracking can be performed using vision-based tracking (e.g., on the HMD), movement-based tracking (e.g., IMU on the impact detection device), auditory or light-based detection (e.g., via puck 310) or the like. System 400 can further include a detection block for detecting a press by a finger, which may be detecting an impact on a surface, detection of the user's hand or finger breaking a predefined plane, or a movement of a finger that is likely to be an intended button press (e.g., detected via IMU on the impact detection device, by a force sensor, strain gauge, breaking a light (e.g., IR) beam, biometrics indicating actuation of a user's finger, etc.). Impact detection devices can be manifested as a ring, wristband, smart watch, puck, or other suitable form factor that can perform impact and/or movement detection functions.

In some embodiments, impact detection can alternatively be achieved by a vision system algorithm (e.g., with no complementary IMU) that is optimized for detecting the motion and deceleration of a finger hitting a physical surface. This algorithm would be optimized differently from a typical in-air gestures as its focus would be detecting the impact with a surface. In such cases, a vision surface tap detection algorithm could be invoked when the user's hand is in the vicinity of a physical surface, on which taps can be made. It could also be invoked when the projected surface keyboard is present (e.g., a user enters a text field, or calls up the keyboard), and/or when the fingers are detected to be over or in the vicinity of this projected surface interface. One of ordinary skill in the art with the benefit of this disclosure would understand the many variations, modifications, and alternative embodiments thereof.

System 400 may include logic block 440 that may be used to detect which key on a virtual keyboard the user is intending to press using one or more of a variety of different methodologies including, but not limited to, finger location tracking relative to keys of the virtual input device (as described above), key press frequency, or probability based on language rules. For instance, with key press frequency, keys that are pressed more frequently over time may be selected over adjacent keys when an ambiguous key press detection occurs. An ambiguous key press detection may be where the system cannot determine with sufficient certainty that a particular key among other keys on a virtual input device has been pressed. With probability based-selections, a particular key may be determined to be pressed over an adjacent key when an ambiguous key press detection occurs because said key may be grammatically more likely to be the user's intended selection. System 400 can further include an AR/VR application 450 to control the operation of blocks 410-440, as would be appreciated by one of ordinary skill in the art with the benefit of this disclosure. System 400 can be part of system 1000 of FIG. 10, as further described below.

Figure 5:
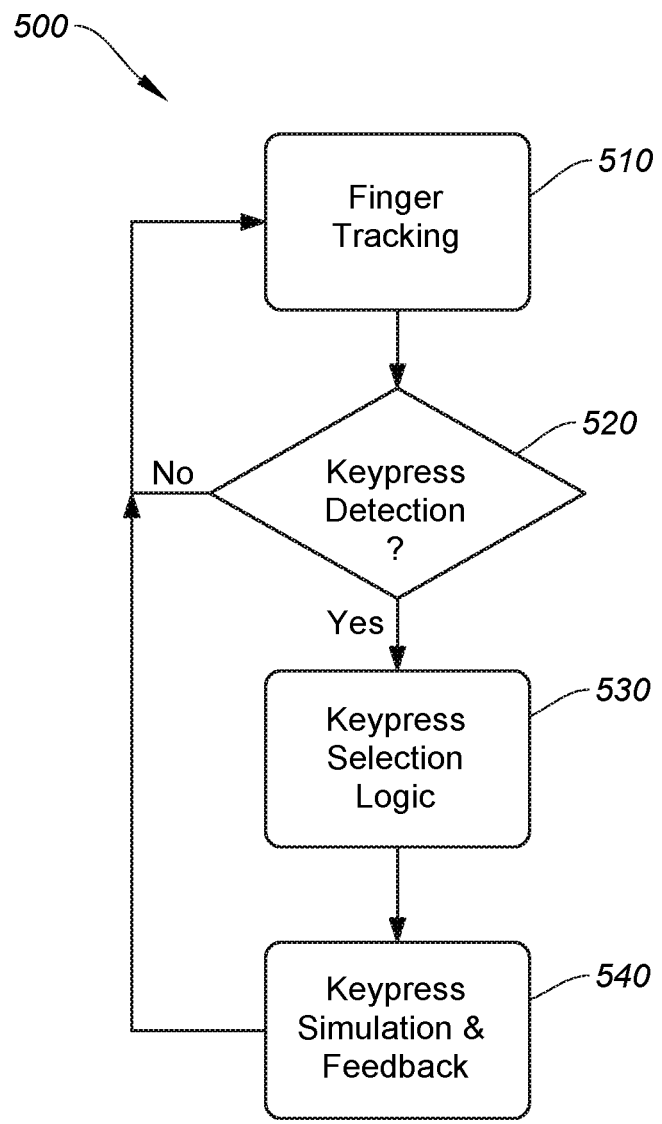
FIG. 5 shows a simplified flow chart for detecting key presses on a virtual input device, according to certain embodiments.

FIG. 5 shows a simplified flow chart 500 for detecting key presses on a virtual input device, according to certain embodiments. Method 500 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 500 can be performed by aspects of computer 1010, display system 1020, or a combination thereof.

At block 510, method 500 can include a finger tracking step to determine a user's hand/finger position over a projected virtual input device, such as a virtual keyboard. A vision-based system such as a camera (e.g., coupled to an HMD) can be used to track hand/finger location and may be supplemented by an impact detection sensor such as a ring(s), wristband, smart watch, standalone sensor (e.g., puck), using one or more of an IMU, direction microphones, light arrays, or the like, as further discussed above. In some embodiments, hand/finger tracking can be supplemented by gaze tracking. For instance, an HMD may scan a user's eye(s) to track where the user is directing their gaze (e.g., to find a key, realign hands, etc.) and further refine a detected location of the user's hand/fingers.

At block 520, method 500 can include determining if a key press is detected. If not, method 500 returns to step 510. If a keypress is detected, method 500 continues to key press selection logic (block 530). As indicated above, a keypress may be detected via impact detection via IMU and additionally or alternatively from biometric information (e.g., a wristband that can capture biometric signals of the user's fingers or wrist that are generated by the user's nervous system when the user makes subtle finger movements and hand gestures, and/or EMG muscle sensors to detect similar biometrics), vision-based detection (e.g., from the HMD), or the like.

At block 530, the keypress selection logic can incorporate further analysis to increase the accuracy of detection. In addition to vision and motion based detection, key press frequency and probability based on a language model can be used to more accurately determine which key of a virtual input device is to be associated with the detected impact.

At block 540, method 500 can perform a key press simulation and feedback. This may include one or more of generating a command (e.g., control signal) and, for instance, sending it to an operating system to indicate a key press. In some cases, audio (e.g., an audible click) and visual feedback (e.g., the selected key of the virtual input device lights up) may be employed. Alternatively or additionally, haptic feedback can be used (e.g., vibration on the ring or wristband). Any suitable type of feedback or combination thereof may be used.

Figure 6:
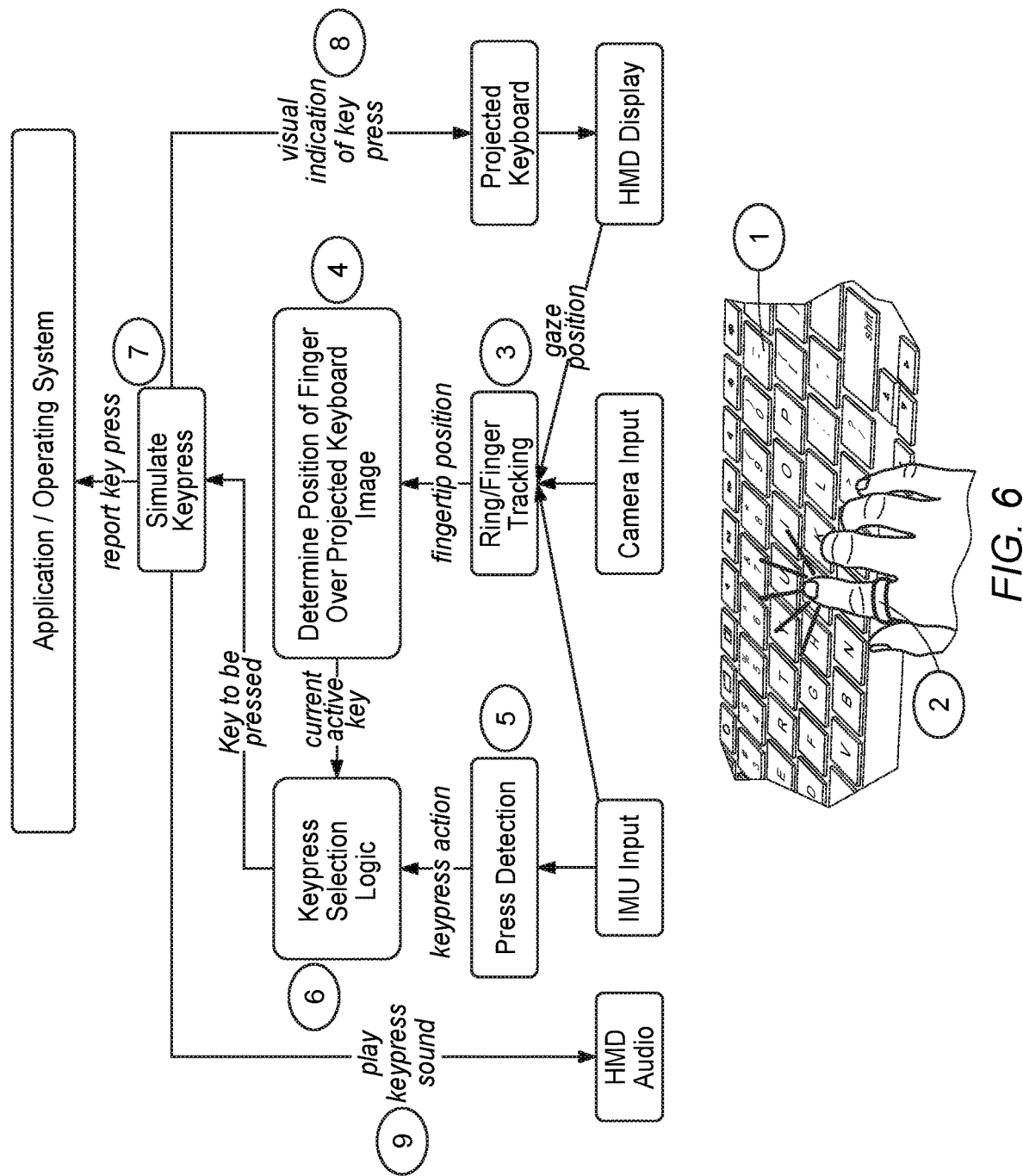
FIG. 6 shows a simplified flow chart for detecting key presses on a virtual input device using a ring-based impact detection device, according to certain embodiments.

FIG. 6 shows a simplified flow chart for detecting key presses on a virtual input device using a ring-based impact detection device, according to certain embodiments. At step 1, a user wearing a display device (e.g., HMD) sees a projected keyboard on a physical surface (e.g., a desk top). At step 2, the user is wearing a ring with an integrated IMU that can enhance the vision-tracking capabilities of the HMD, which may have a scan rate (in some embodiments) that is too slow to capture fast movements (e.g., clicks) by a user. At step 3, user finger tracking can be performed using any combination of camera input (e.g., from the HMD), IMU input data from the ring, gaze data from the HMD, and the like, as further described above. In some embodiments, other impact detection schemes may be employed, including the use of proximity sensor(s), microphone arrays (as described above), strain gauge(s), or other suitable impact detection technique as would be appreciated by one of ordinary skill in the art with the benefit of this disclosure.

At step 4, tracking information can then be further processed to determine where, over the virtual keyboard, the user's fingertips are located to identify a corresponding key. At step 5, the ring's IMU can further be used to detect acceleration and/or angular velocity to detect an impact (e.g., key press). At step 6, keypress selection logic can determine which key is pressed based on a key press action event, the determined finger position (active key) (step 4), supporting information from a language model that can be used to provide a probability of a next key press, or the like, as further described above.

At step 7, once the "pressed" key is determined, the keypress event can be simulated in a number of ways, including a visual indication of a key press (step 8) showing press/release of a virtual key, an auditory indication of a key press (step 9), such as a key press sound or audible click, and/or tactile feedback (e.g., haptics), or the like, as described above. Further, the detected key press event can be reported to a corresponding application and/or operating system running on the AR/VR system (e.g., see FIG. 10).

Figure 7:
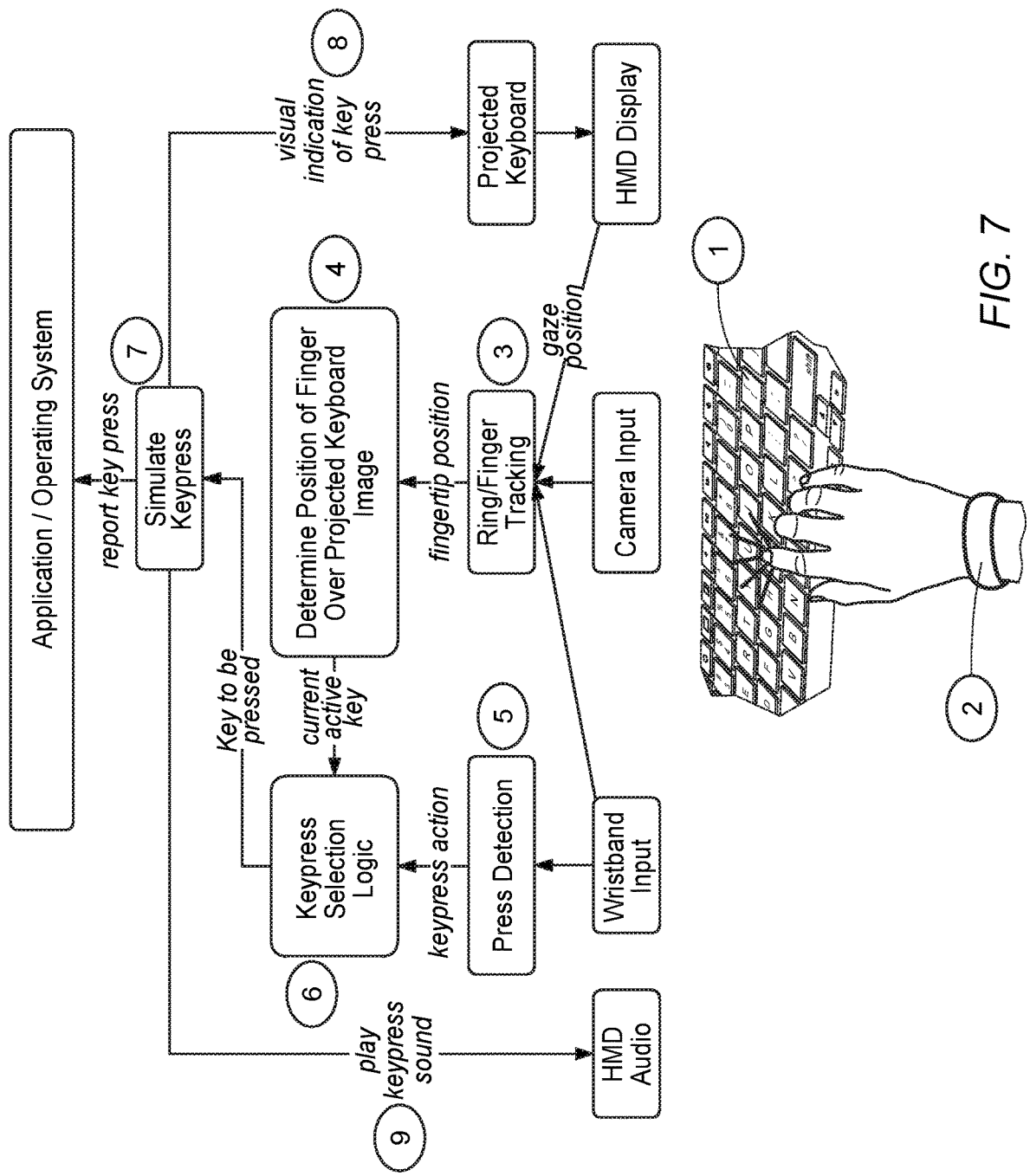
FIG. 7 shows a simplified flow chart for detecting key presses on a virtual input device using a wristband-based impact detection device, according to certain embodiments.

FIG. 7 shows a simplified flow chart for detecting key presses on a virtual input device using a wristband-based impact detection device, according to certain embodiments. The flowchart of FIG. 7 is similar to FIG. 6, but for some differences due to the use of a wristband instead of a finger-mounted ring device. The wristband device can have an integrated IMU for impact detection and may incorporate biometric signals to supplement movement tracking, as described above.

Figure 8:
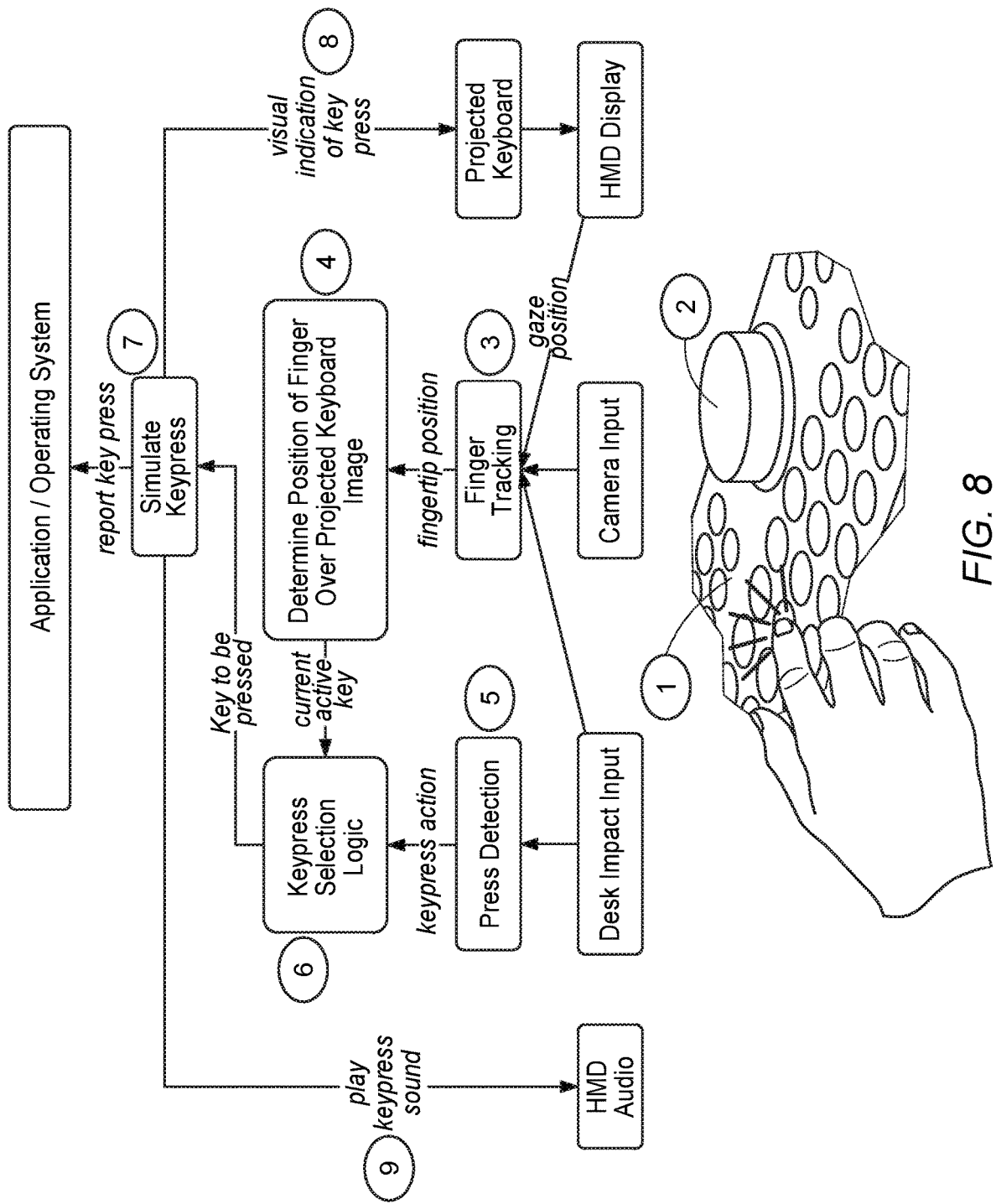
FIG. 8 shows a simplified flow chart for detecting key presses on a virtual input device using a standalone impact detection device, according to certain embodiments.

FIG. 8 shows a simplified flow chart for detecting key presses on a virtual input device using a standalone impact detection device, according to certain embodiments. The standalone impact detection device can be a "puck" or "orb" that sits on a desktop and can detect impacts (e.g., taps) on the desktop surface via IMU, integrated directional microphones, light arrays, or the like. The "puck" may further enhance video-based finger/hand tracking performed by the HMD. In some cases, the user wears the HMD to see the projected keyboard on the desktop surface, which is projected relative to the puck. For press detection, IMU acceleration, detected angular velocity, and/or direction audio input can be used to detect an impact (i.e., impact). The system of FIG. 8 can be otherwise similar in operation to the flow charts of FIGS. 6-7.

In some embodiments, the puck may project a light field (e.g., IR light field) of the virtual input device where the perceived virtual keyboard will be located on the desktop surface. Impact detection can be determined by detecting a break in the IR field, which can be further supplemented using a microphone array, as described above and as would be appreciated by one of ordinary skill in the art with the benefit of this disclosure.

Figure 9:
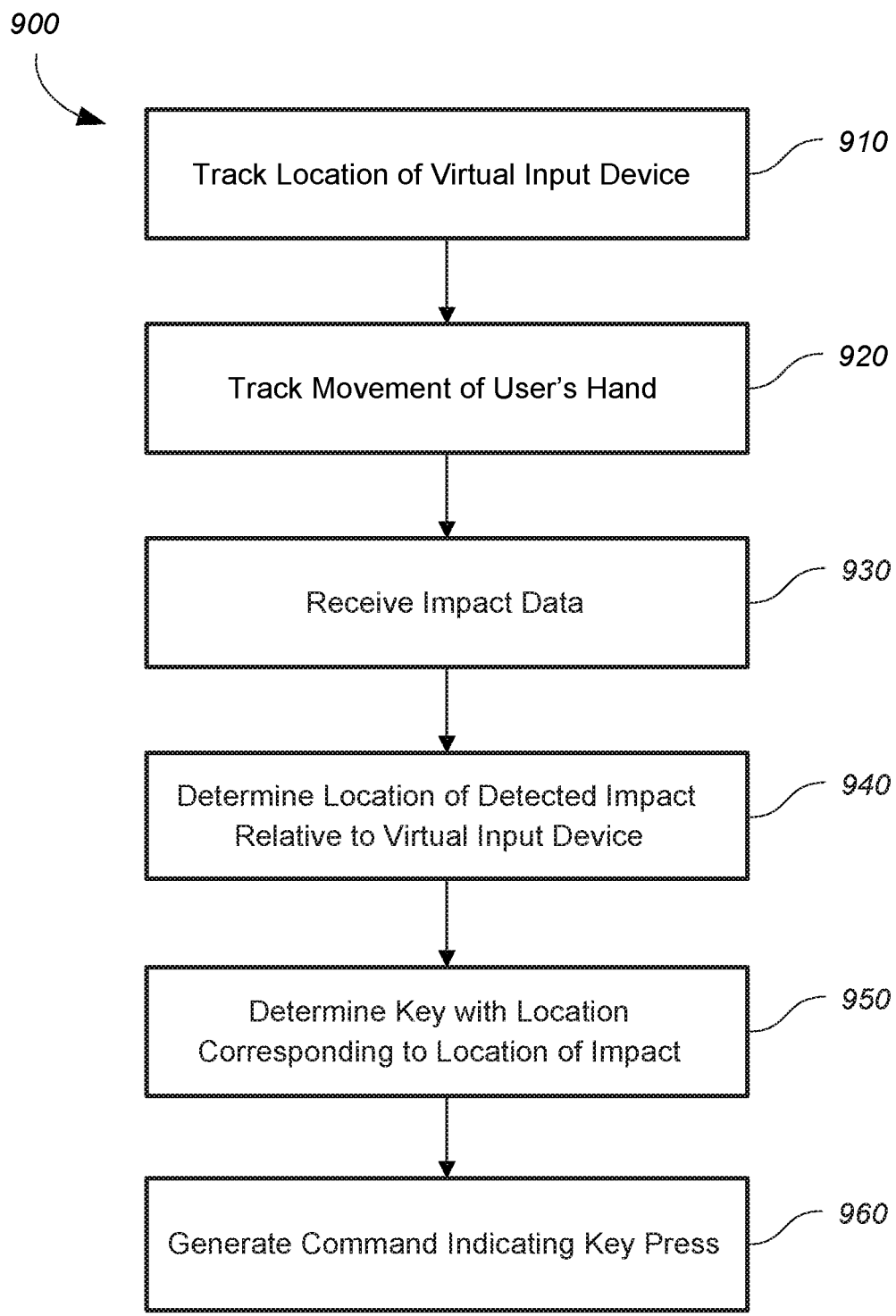
FIG. 9 shows a simplified flow chart for detecting key presses on a virtual input device, according to certain embodiments.

FIG. 9 shows a simplified flow chart for detecting key presses on a virtual input device, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by aspects of computer 1010, display system 1020, or a combination thereof.

At block 910, method 900 can include tracking a displayed location (e.g., via HMD) of a virtual input device in a virtual reality or augmented reality (VR/AR) environment, according to certain embodiments. In some aspects, the virtual input device may be rendered by a display device, such as an HMD.

At block 920, method 900 can include tracking a movement of a user's hand within the VR/AR environment, according to certain embodiments. Tracking can be performed by image analysis (e.g., vision-tracking via HMD), via IMU (e.g., integrated with the impact detection device), audio or light field tracking (e.g., via the "puck" as described above), or any combination thereof.

At block 930, method 900 can include receiving, from an impact detection device, impact data corresponding to a detected impact of the at least one finger of the user's hand on a physical surface, according to certain embodiments. The impact detection device can be a ring (e.g., via IMU), wristband or smart watch (e.g., via IMU, biometrics), standalone device (e.g., via IMU, biometrics, audio detection, light detection, etc.) or the like, as further described above.

At block 940, method 900 can include determining a location of the detected impact relative to the rendered virtual input device, according to certain embodiments. In some cases, the virtual input device may be a virtual keyboard and may include one or more virtual keys.

At block 950, method 900 can include determining a first virtual key of the one or more virtual keys that has a location corresponding to the location of the detected impact.

At block 960, method 900 can include in response to determining that the first virtual key has a location corresponding to the location of the detected impact, generating a command indicating a key press of the first virtual key.

In some cases, the impact detection device can be one of a ring or a wristband worn by the user, where the detected impact is detected via an IMU coupled to the impact detection device that is configured to track a motion of the input device in three-dimensional (3D) space. The impact detection device can be a standalone device configured to be placed on the physical surface to detect impacts, where the detected impact is detected via IMU or a plurality of directional microphones configured to detect the location of the user's finger relative to the rendered virtual input device and the corresponding impact force.

In some cases, tracking of the movement of the user's hand within the VR/AR environment is performed by a vision-based tracking system coupled to the display device. In some implementations, the determining of the first virtual button having a location corresponding to the location of the detected impact may be based upon the vision-based tracking system and one or more of a key press frequency analysis for the one or more virtual keys or a probability of a next virtual key to be pressed based on a language model.

In certain embodiments, method 900 may include generating at least one of an auditory feedback, visual feedback, or haptic feedback indicating that a keypress of the first virtual key is detected. Some embodiments of method 900 may include determining whether the detected impact has a detected impact force greater than a force threshold value and generating the command indicating a key press of the first virtual key is further based upon whether the detected impact force is greater than the force threshold value.

It should be appreciated that the specific steps illustrated in FIG. 9 provide a particular method 900 for detecting key presses on a virtual input device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 10:
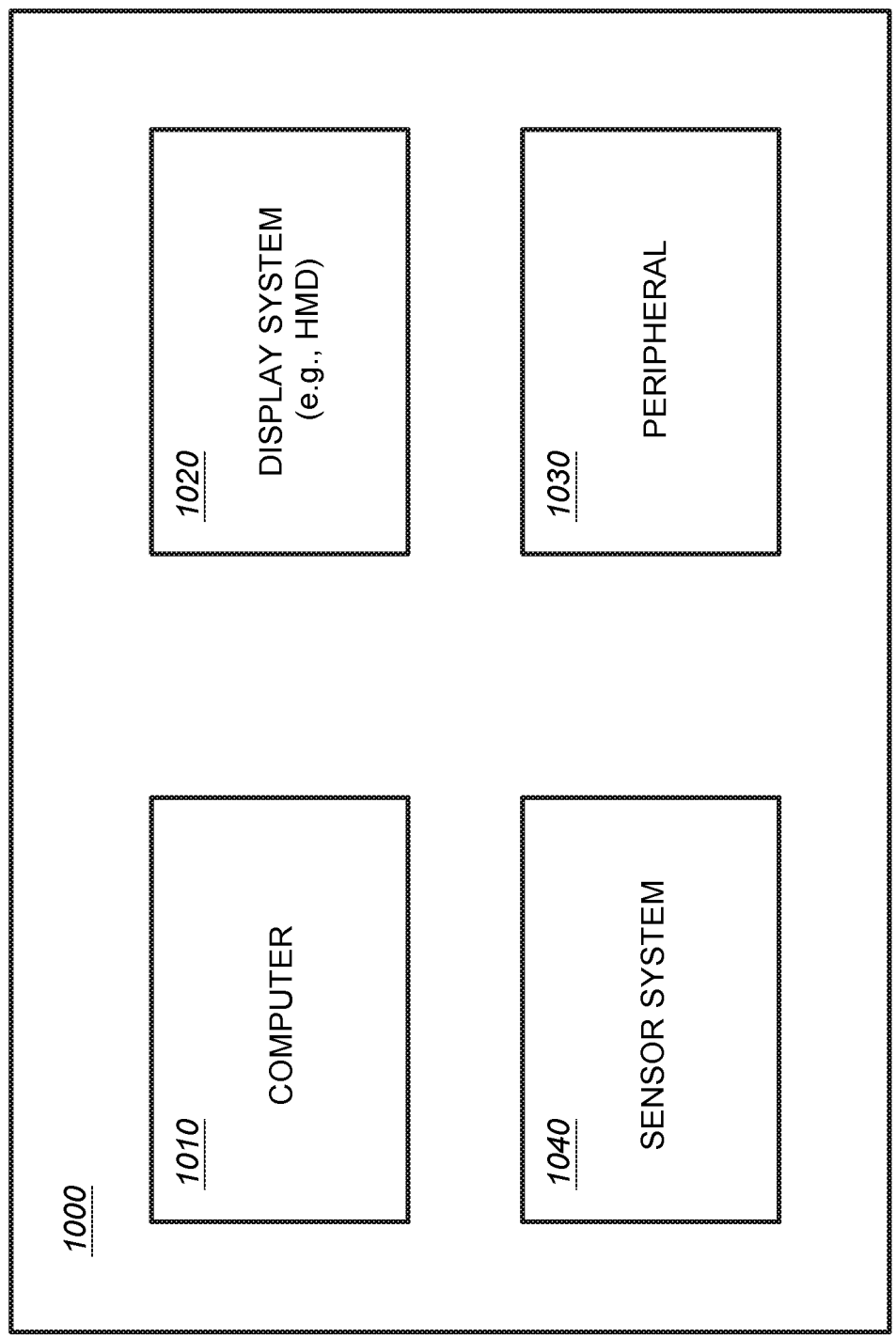
FIG. 10 shows a simplified block diagram of a system to operate an AR/VR workstation environment, according to certain embodiments.

FIG. 10 shows a simplified diagram of a AR/VR system environment (SE) 1000, according to certain embodiments. SE 1000 can include computing system 1010, display system 1020, sensor system 1040, and peripheral device(s)

1030. Peripheral device 1030 may be a virtual peripheral device rendered for display to a user (e.g., by HMD). Computing system 1010 can be capable of providing an augmented/mixed/virtual reality environment to a user via display system 1020. Display system 1020 can be embodied as an HMD, virtual reality display, holographic imaging device, or other display capable of providing computer-rendered images to a user. The peripheral devices 1030 can be a physical user interface device configured to enable a user to interface with the AR/VR environment facilitated by computer 1010. Sensor system 1040 may sense and provide position and orientation information to computer 1010, including a location of the one or more peripheral devices, the user, body parts of the user (e.g., location of head, hands, arms, etc.), physical characteristics of the physical environment around the one or more peripheral devices (e.g., location of surfaces, walls, objects, obstructions, etc.), and the like, as further described below.

Computer 1010 can include a host processor, which may include a microprocessor, multiple processors and/or co-processor chips, and/or digital signal processor (DSP) capability, or the like. A system clock (not shown) may be coupled to or part of te host processor to provide timing data. Computer 1010 may include an audio system including audio output devices to provide audio to a user, as would be appreciated by one of ordinary skill in the art with the benefit of this disclosure. For example, the audio feedback of a keypress, as described above, could be generated by the audio output device. Display system 1020 may display images of a simulation, game environment, operating system application or other images associated with the simulation. As shown in the figures and corresponding description, display system 1020 can render images of an AR/VR workstation environment. Display system 1020 may be part of an HMD, forming/displaying the workstation environment, or display system 1020 may be a separate secondary display device (e.g., holographic display device) to allow configuration of the system by the user without needing to wear the HMD, or configuration of the system by any other person, or to allow a secondary non-VR display of the virtual reality environment, e.g., for observational, run-time configurational, safety or any other purpose(s). Computer 1010 may include other known components, such as random access memory (RAM), read-only memory (ROM), and input/output (I/O) systems, and the like, as would be appreciated by one of ordinary skill in the art.

Computer 1010 may implement an application program, which may be a simulation program for generation of the AR/VR system environment. The user may interact with the program via peripherals 1030 (e.g., keyboard, mouse, stylus, etc.) and/or virtual peripherals, such as a virtual keyboard or other virtual input device. The application program may include multiple rendered displays arranged relative to a peripheral device to display an office productivity environment, a gaming environment, an interactive digital location (e.g., home, virtual store, sporting arena, etc.), medical procedure simulation, computer-aided design applications, or other type of virtual arrangement of interfaces. The application program may comprise or access an external database, such as over a network. The application program may be implemented as one or more modules or other functional units. Herein, for simplicity, operating systems such as Windows®, Android®; IOS; MS-DOS®, MacOS®, Linux, etc., are also referred to as application programs may be device drivers for hardware associated with the computer. Typically, the application program can be capable of providing instructions for the generation of a graphical environment on display system 1020. It may provide images to be displayed on an HMD and may output other feedback, such as auditory or vibration (haptic) signals. The application program may be operable to check for input signals from peripherals and provide the corresponding output. The application program may interface with an HMD and/or other peripherals via a device driver, whereby the device driver communicates with the device through an electronic circuitry of I/O system.

Computer 1010 may be embodied in a personal computer, workstation, laptop or server, such as a PC compatible computer, Apple® personal computer, smart device (e.g., smart phone, smart watch, etc.), a standalone HMD system, a tablet computer, or other suitable computing system. In some cases, computer 1010, as well as the other computers described throughout this disclosure (e.g., computer 1110), may incorporate aspects of cloud computing for offloading processing functions. One of ordinary skill in the art with the benefit of this disclosure would understand the many variations, modifications, and alternative embodiments thereof. Computer 1010 may be operable under the Windows®, MacOS®, Unix®, or MS-DOS® operating system or the like.

In some embodiments, sensor system 1040 may include an object tracking system having a camera system, such as one of more of a: 2D camera; a 3D camera; an IR camera; a time of flight (ToF) camera, or the like, which may utilize CMOS, CCD, IR, or other suitable type of image sensors. Sensor system may further incorporate touch sensing capabilities, which may include capacitive-based and/or resistor-based touch sensors (FSR), or the like. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Further aspects of sensor system 1040 are further described below. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Peripheral(s) can include a virtual input device (e.g., keyboard) or a physical input device, such as a keyboard, computer mouse, audio devices (e.g., speakers), stylus/touch devices, presenter devices, touch pads, camera-based devices (e.g., a webcam), printers, or the like.

Although certain systems may not expressly discussed, they should be considered as part of SE 1000, as would be understood by one of ordinary skill in the art. For example, SE 1000 may include a bus system to transfer power and/or data to and from the different systems therein. In some embodiments, SE 1000 may include a storage subsystem (not shown). A storage subsystem can store one or more software programs to be executed by processors. It should be understood that "software" can refer to sequences of instructions that, when executed by processing unit(s) (e.g., processors, processing devices, etc.), cause SE 1000 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

Figure 11:
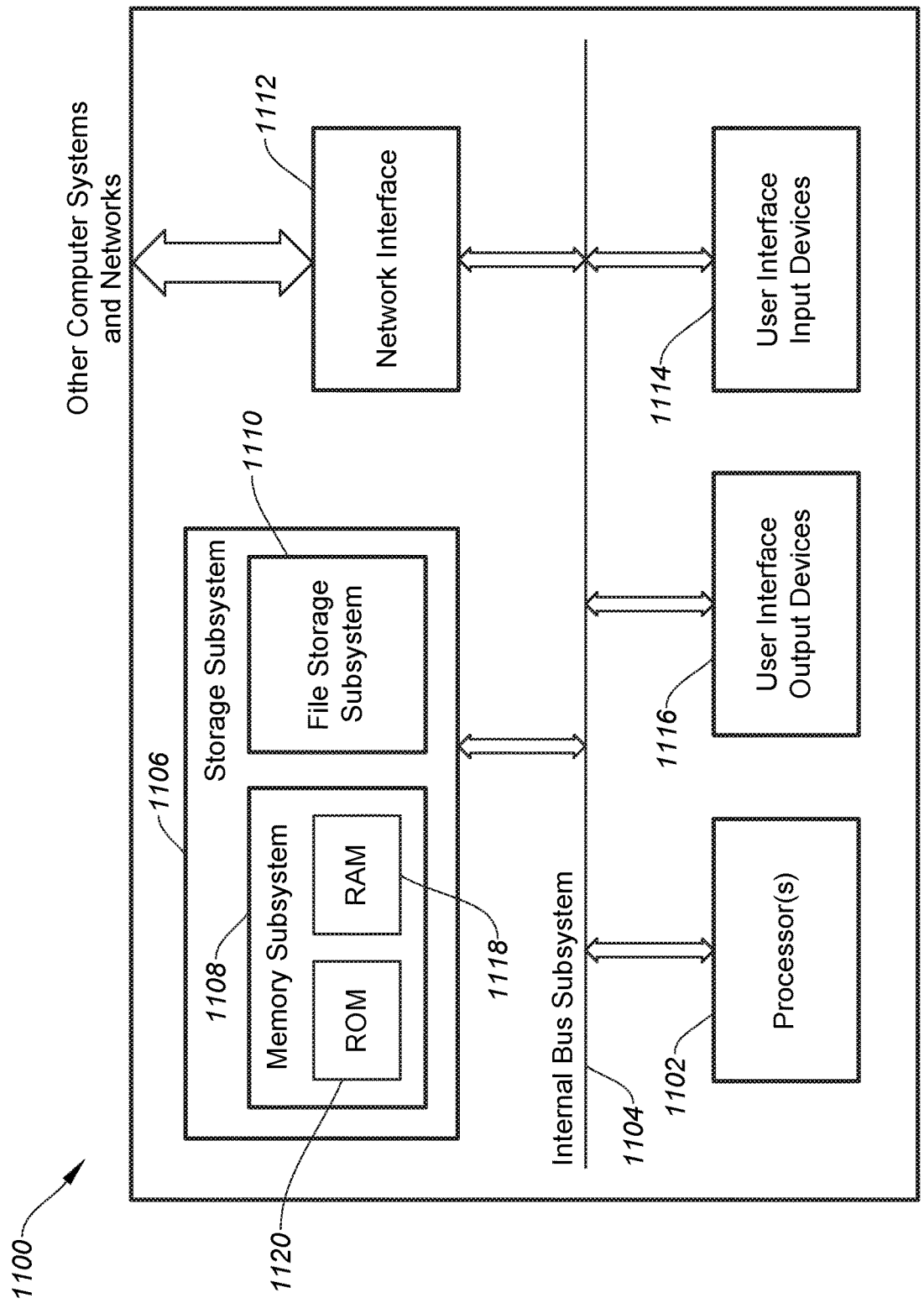
FIG. 11 shows a system for operating a host computing device, according to certain embodiments.

FIG. 11 shows a system 1100 for operating a host computing device (e.g., host computing device 1110), according to certain embodiments. System 1100 can be used to implement any of the host computing devices discussed herein and the myriad embodiments defined herein or within the purview of this disclosure but not necessarily explicitly described. System 1100 can include one or more processors 1102 that can communicate with a number of peripheral devices (e.g., input devices) via a bus subsystem 1104. These peripheral devices can include storage subsystem 1106 (comprising memory subsystem 1108 and file storage subsystem 1110), user interface input devices 1114, user interface output devices 1116, and network interface subsystem 1112. User input devices 1114 can be any of the input device types described herein (e.g., keyboard, computer mouse, remote control, etc.). User output devices 1116 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 1104 can provide a mechanism for letting the various components and subsystems of computer system 1100 communicate with each other as intended. Although internal bus subsystem 1104 is shown schematically as a single bus, alternative embodiments of the bus subsystem can utilize multiple buses. Additionally, network interface subsystem 1112 can serve as an interface for communicating data between computer system 1100 and other computer systems or networks. Embodiments of network interface subsystem 1112 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 1114 can include a keyboard, a presenter, a pointing device (e.g., mouse, trackball, touchpad, etc.), a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1100. Additionally, user interface output devices 1116 can include a display subsystem, a printer, or non-visual displays such as audio output devices, etc. The display subsystem can be any known type of display device. In general, use of the term "output device" is intended to include all possible types of devices and mechanisms for outputting information from computer system 1100.

Storage subsystem 1106 can include memory subsystem 1108 and file storage subsystem 1110. Memory subsystems 1108 and file storage subsystem 1110 represent non-transitory computer-readable storage media that can store program code and/or data that provide the functionality of embodiments of the present disclosure. In some embodiments, memory subsystem 1108 can include a number of memories including main random access memory (RAM) 1118 for storage of instructions and data during program execution and read-only memory (ROM) 1120 in which fixed instructions may be stored. File storage subsystem 1110 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and not intended to limit embodiments of the present disclosure. Many other configurations having more or fewer components than system 1100 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

The present document provides illustrations and descriptions, but is not intended to be exhaustive or to limit the scope of the invention to the precise form disclosed. Modifications and variations are possible in light of the above teachings or may be acquired from practice of various implementations of the present disclosure.

What is claimed is:

1. A method of tracking a user interaction with a virtual input device, the method comprising:
    tracking a displayed location of a virtual input device, the virtual input device rendered by a display device to be displayed on a physical work surface;
    tracking a movement of a user's hand via optical data from optical sensors of a head mounted display (HMD);
    receiving, from an inertial measurement unit (IMU) coupled to a wristband, impact data including acceleration or angular velocity data that corresponds to a detected impact of at least one finger of the user's hand on a physical surface;
    receiving, from a biometric sensor coupled to the wristband, biometric data corresponding to movement of the user's hand and fingers;
    determining a location of the detected impact relative to the rendered virtual input device on the physical work surface based on the impact data, the biometric data, and the optical data, the virtual input device including one or more virtual keys;
    determining whether the detected impact has a detected impact force greater than a force threshold value;
    determining a first virtual key of the one or more virtual keys that has a location corresponding to the location of the detected impact; and
    in response to determining that the first virtual key has a location corresponding to the location of the detected impact on the physical work surface and that the detected impact force is greater than the force threshold value, generating a command indicating a key press of the first virtual key.

2. The method of claim 1 wherein tracking the displayed location of the virtual input device includes tracking the location in a virtual reality or augmented reality (VR/AR) environment.

3. The method of claim 1 wherein the determining of the location of the detected impact is performed by an impact detection device that is a standalone device configured to be placed on the physical surface to detect impacts, wherein the detected impact is detected via IMU and a plurality of directional microphones configured to detect the location of the user's finger relative to the rendered virtual input device and the corresponding impact force.

4. The method of claim 1 wherein the tracking of the movement of the user's hand is performed by a vision-based tracking system coupled to the display device.

5. The method of claim 4 wherein the determining of the first virtual key having a location corresponding to the location of the detected impact is based upon the vision-based tracking system and one or more of:
    a key press frequency analysis for the one or more virtual keys; or
    a probability of a next virtual key to be pressed based on a language model.

6. The method of claim 1 further comprising:
    generating at least one of an auditory feedback, visual feedback, or haptic feedback indicating that a keypress of the first virtual key is detected.

7. The method of claim 1 wherein the virtual input device is a virtual keyboard.

8. The method of claim 1 wherein the display device is a head-mounted display (HMD).

9. A system comprising:
    one or more processors;
    one or more non-transitory, computer-readable storage mediums containing instructions configured to cause the one or more processors to perform operations including:
    tracking a displayed location of a virtual input device, the virtual input device rendered by a display device to be displayed on a physical work surface;
    tracking a movement of a user's hand via optical data from optical sensors of a head mounted display (HMD);
    receiving, from an inertial measurement unit (IMU) coupled to a wristband, impact data including acceleration or angular velocity data that corresponds to a detected impact of at least one finger of the user's hand on a physical surface;
    receiving, from a biometric sensor coupled to the wristband, biometric data corresponding to movement of the user's hand and fingers;
    determining a location of the detected impact relative to the rendered virtual input device on the physical work surface based on the impact data, the biometric data, and the optical data, the virtual input device including one or more virtual keys;
    determining whether the detected impact has a detected impact force greater than a force threshold value;
    determining a first virtual key of the one or more virtual keys that has a location corresponding to the location of the detected impact; and
    in response to determining that the first virtual key has a location corresponding to the location of the detected impact on the physical work surface and that the detected impact force is greater than the force threshold value, generating a command indicating a key press of the first virtual key.

10. The system of claim 9 wherein tracking the displayed location of the virtual input device includes tracking the location in a virtual reality or augmented reality (VR/AR) environment.

11. The system of claim 10 wherein the tracking of the movement of the user's hand within the VR/AR environment is performed by a vision-based tracking system coupled to the display device.

12. The system of claim 9 wherein the instructions are further configured to cause the one or more processors to perform operations including:

generating at least one of an auditory feedback, visual feedback, or haptic feedback indicating that a keypress of the first virtual key is detected.

\* \* \* \* \*